Patented Aug. 22, 1933

1,923,221

UNITED STATES PATENT OFFICE 1,923,221

PROCESS OF MELTING GLASS

Fred M. Locke, deceased, and Fred J. Locke, deceased, Victor, N. Y., by Mercie P. Locke, Victor, N. Y., executrix and administratrix de bonis non, assignor to Corning Glass Works, Corning, N. Y.

No Drawing. Application March 23, 1931
Serial No. 524,769

28 Claims. (Cl. 49—77)

The present invention relates to a method of melting glass in contact with carboniferous material, as in a carboniferous container, without discoloration of glass by the carbon.

To these ends the invention comprises adding to the batch to be melted a substantial quantity of zinc oxide, or other oxide, easier to reduce than ferrous oxide, and the product of the reduction of which is without substantial effect on the color of the glass, and melting the batch in contact with carboniferous material, and specifically a graphite, or graphite carbon, or graphite clay crucible. They have discovered that, when an oxidizing compound of the metal antimony, such for example as sodium antimonate, or potassium antimonate, or a reducing compound of antimony such as antimony trioxide, with an oxidizing agent such for example as sodium or potassium nitrate (except in some cases where heavy oxidizing conditions prevail during the melting) is added to a glass batch that such a batch can be melted in a container containing carbon or graphite to produce a transparent colorless glass (unless of course coloring agents are added to such batch) surpassing the best glass made in regular crucibles. It has heretofore been believed that glasses, especially glasses containing substantial amount of alkalies, could not be melted in such crucibles, which are in general use for melting brass, copper, etc., without heavy discoloration of the glass by the carbon.

A graphite crucible has a number of advantages over the ordinary clay crucible used for melting glass:

First, graphite crucibles generally have very low expansion and can be placed directly in the fire without preliminary heating, whereas, clay crucibles have to undergo, especially large clay crucibles, a long gradual increase in heat before melting glass in them.

Second, a clay crucible after being heated cannot be cooled as it will invariably crack, whereas, the graphite crucible can be heated and cooled any number of times without cracking.

Third, if the glass to be melted is an optical glass and is desired to be cooled in the crucible; a decided advantage in melting in graphite is obtained as the glass, when cooled, remains in a single piece, will not adhere to the crucible and can be removed bodily, permitting the crucible to be used again, whereas, a porcelain crucible breaks to pieces with the glass adhering to it.

Fourth, graphite and carbon crucibles are excellent conductors of electricity and offer a means of melting glass electrically, especially where power is cheap, whereas, porcelain crucibles are insulators.

They have discovered that when an oxide of zinc, or other suitable oxide easier to reduce than ferrous oxide and the product of reduction of which does not impart a substantial color to the glass, is added to a glass batch that such a batch can be melted in a container containing carbon or graphite to produce a transparent colorless glass (unless of course coloring agents are added to the batch) passing the best glass made in standard clay crucibles.

Their discovery affords a way by which a large number of standard glasses used in every day commerce can be melted in carboniferous containers to produce clear glass, not only for optical purposes and ultra-violet transmission but many other purposes for which glass is used.

The following batches are examples of batches which can be melted in accordance with the present invention:

|  | A | B | C | D | E | F |
|---|---|---|---|---|---|---|
| Silica | 50 | 50 | 43.5 | 47.75 | 44 | 47.5 |
| Alumina hydrate | 5 | 5 | 19.25 | 9.5 | 19.5 |  |
| Alumina (calcined) |  |  |  |  |  | 9.5 |
| Zinc oxide | 5 | 5 | 2.5 | 4.75 | 2 | 4.75 |
| Boric acid | 15 | 15 | 19.5 | 14.25 | 19.5 | 14.25 |
| Sodium carbonate | 25 | 24.75 | 5 | 23.75 | 5 | 23.75 |
| Sodium antimonate |  | 0.25 | 9.25 |  |  |  |
| Sodium fluoride |  |  | 10 |  | 10 |  |

In lieu of the use of zinc oxide in the above formulæ, other oxides, which reduce more easily than ferrous oxide and which do not when reduced appreciably color the glass, may be used. Examples of such oxides are oxides of tin and arsenic.

The above batches should, by preference, be melted in closed crucibles. With ordinarily pure materials the resultant glass will be substantially colorless; but it is understood that the invention, as above described, can be used to produce colored glass by adding to the above, or similar batches, suitable glass coloring material.

Several of the above batches contain a reducible salt of antimony which we have found advantageous for use with zinc oxide. Batches containing such salts of antimony, without zinc, tin, etc., were described and claimed in their copending application Sr. No. 379,315, filed July 18, 1929, of which this application is a continuation in part.

The amount of antimony compound in the batch can be varied considerably say from ⅛ of one percent of the batch up to or exceeding say 10% of the batch, or that of antimony oxide in the finished glass of from $\frac{1}{16}$% up to and exceeding 10%.

If a reducing compound of antimony is used in the batch, the amount of oxidizing agent accompanying it may be varied: as for example if .5% of $Sb_2O_3$ is used in the batch then say .5% of sodium nitrate will be effective. This amount can be varied, however, as long as a suitable working glass is obtained depending somewhat upon the conditions of firing.

The compounds of antimony are very easily reduced and melt at a relatively low heat, but have a very high volatilizing point, and graphite and carbon crucibles are known as powerful reducing agents. It is their theory that the antimony material in the batch, on melting, forms a film of reduced antimony material over the outer surface of the batch, between the latter and the walls of the container, and that the oxidizing agent in the batch, during the melting, keeps the main part of the glass (except the thin film of reduced antimony material on the surface of the glass and in contact with the crucible walls and bottom) in an oxidizing condition, so that, when the melting operation is over and working and bubbling of the batch ceases, a thin film of reduced antimony material, covering the glass surface and situated between the main body of the glass and the container, prevents the glass from taking color from the container as would happen if the antimony film were not there. That this is true is proved by the fact that, when antimony oxide is added to the batch without an oxidizing agent, the antimony reduces throughout the glass during melting, and the glass colors from the container forming an opaque blue gray glass.

The batch should preferably be melted in a closed crucible or container as oxidation at the surface will tend to remove the film of antimony. This film of reduced antimony material will vary with the amount of antimony used and at the end of the melting operation if the glass is to be poured or worked, this film should be skimmed off if too thick.

A graphite clay crucible suitable for use with this method is manufactured by the Vesuvius Crucible Company, of Swissvale, Pa., and is known as its "Century Crucible". Another suitable crucible is manufactured by the Acheson Graphite Company, of Niagara Falls, New York, from its graphite electrode. This latter crucible is especially desirable if the resulting glass is to be used for ultra-violet transmission.

The following five batches are examples of batches which can be employed according to the present invention.

G

| | |
|---|---|
| Silica (flint) | 50 |
| Alumina hydrate | 5 |
| Sodium fluoride | 5 |
| Borax | 30 |
| Boric acid | 8.5 |
| Sodium antimonate | 1.5 |
| | 100 |

H

| | |
|---|---|
| Silica (flint) | 52 |
| Sodium fluoride | 7 |
| Sodium antimonate | .5 |
| Aluminum hydrate | 5.5 |
| Boric acid | 5 |
| Borax | 30 |
| | 100 |

I

| | |
|---|---|
| Silica (flint) | 52 |
| Alumina hydrate | 11 |
| Boric acid | 24 |
| Sodium fluoride | 10 |
| Antimony oxide | 2 |
| Sodium nitrate | 1 |
| | 100 |

J

| | |
|---|---|
| Silica (flint) | 60 |
| Calcium hydrate | 10 |
| Sodium carbonate | 20 |
| Sodium antimonate | 7 |
| Borax | 3 |
| | 100 |

K

| | |
|---|---|
| Silica (flint) | 50 |
| Boric acid | 20 |
| Sodium carbonate | 20 |
| Alumina hydrate | 5 |
| Sodium antimonate | 5 |
| | 100 |

Batches G, H and I will produce sodium borosilicate glasses of relatively low expansion, and batch J is a soda-lime glass, such as a window or bottle glass.

It will be noted that in batches G and H, borax is the principal flux together with sodium fluoride; in batch I, sodium fluoride is the principal flux; in batch J, sodium carbonate together with calcium is the flux; and in batch K, sodium carbonate is the principal one.

It will thus be seen that this part of their invention can be practiced with a large number of batches and with different kind of fluxes, and with glasses having high alkali content, or low alkali content. The antimony content can be varied from a very small percent to a very large percent, and yet none of these glasses will take color from the graphite container.

It will be understood that while the above batches are given as merely illustrating their invention, they do not wish to be limited to such batches or ingredients as shown, as many types of batches and glasses and different ingredients can be used. The antimony can be used in different percents depending upon the particular glass, the melting conditions and the amount desired in the finished glass. However very small amounts of the antimony are very efficacious. The following are the compositions of three glasses made under their method and showing the amount of antimony in the finished glass.

| | #1 | #2 | #3 | |
|---|---|---|---|---|
| | Per cent | Per cent | | Per cent |
| Silica | 65 | 63 | | 70 |
| Alumina | 4.85 | 5 | | --- |
| Antimony oxide | .15 | 2 | | 7 |
| Sodium oxide | 17 | 17 | | 15 |
| Boric oxide | 13 | 13 | Calcium oxide | 8 |
| | 100 | 100 | | 100 |

In the following claims "carboniferous" is used to include any material containing carbon or yielding carbon when used under glass melting conditions, and "container" is used as a generic expression to include tanks, pots or crucibles. It will be understood that in the appended claims when I have used the expression "oxidizing and a antimony materials" I mean an oxidizing compound of antimony, or an oxidizing agent added to a batch containing an antimony compound melted under such oxidizing conditions as to render an oxidizing agent in the batch unnecessary.

Having thus described their invention what they claim as new and desire to secure by United States Letters Patent, is:

1. The method of melting a batch containing a substantial quantity of oxide more reducible than ferrous oxide and the product of reduction of which does not substantially color the resultant glass in contact with carboniferous material.

2. The method of melting a batch containing a substantial quantity of oxide more reducible than ferrous oxide and the product of reduction of which does not substantially color the resultant glass in a carboniferous container.

3. The method of melting a batch containing a substantial quantity of oxide more reducible than ferrous oxide and the product of reduction of which does not substantially color the resultant glass in a covered carboniferous crucible.

4. The method of melting a glass batch containing a substantial quantity of zinc oxide in contact with carboniferous material.

5. The method of melting a glass batch containing a substantial quantity of zinc oxide in a carboniferous crucible.

6. The method of melting a glass batch containing a substantial quantity of zinc oxide in a covered carboniferous crucible.

7. The method of melting a glass batch containing antimony and a substantial quantity of an oxide more reducible than ferrous oxide and the product of reduction of which does not substantially color the resultant glass in contact with carboniferous material.

8. The method of melting a glass batch containing antimony and a substantial quantity of an oxide more reducible than ferrous oxide and the product of reduction of which does not substantially color the resultant glass in a carboniferous crucible.

9. The method of melting a glass batch containing antimony and a substantial quantity of an oxide more reducible than ferrous oxide and the product of reduction of which does not substantially color the resultant glass in a covered carboniferous crucible.

10. The method of making glass which consists in melting a suitable glass batch containing an oxidizing agent in a graphite container, and during such melting forming from ingredients in the batch a film about the glass to prevent carbon of the container affecting the color of the glass.

11. The method of making substantially colorless glass which consists of melting a glass batch containing an antimony compound in a graphite container and causing a film of reduced antimony to form about the glass to protect such glass from the carbon in the container.

12. The method of making glass which consists in melting a glass batch containing an antimony compound under oxidizing conditions in a graphite container.

13. The method of making glass comprising melting a glass batch containing an antimony compound in a graphite container to provide a carbon protecting film of reduced antimony about the melting batch.

14. The method of making glass which consists in melting a glass batch containing silica, an alkali and an antimony compound in a graphite container to provide a substantially colorless glass.

15. The method of making glass which consists of melting in a graphite container, a glass batch containing at least approximately 50% silica, a compound of boron, an alkali, and a compound of antimony to produce a carbon protecting film of reduced antimony about the melting batch.

16. The method of making glass which consists in melting a glass batch containing silica, alkali, and an antimony compound in a graphite container to produce a substantially colorless glass.

17. The method of making glass which consists in melting a glass batch containing from ⅛ to 10% of antimony material in a graphite container.

18. The method of making glass substantially free from coloring effects from the container which consists in melting a glass batch containing oxidizing and antimony materials in a graphite container.

19. The method of making glass which comprises melting a glass batch containing sodium antimonate in a graphite container.

20. The method of making glass which comprises melting a glass batch containing antimony oxide and an oxidizing agent in a graphite container.

21. The method of making glass which comprises melting a glass batch containing an oxidizing compound of antimony in a graphite container.

22. The method of making glass which comprises melting a glass batch containing an antimony compound and an oxidizing agent in a graphite container.

23. The method of making glass which consists of melting in a graphite container, a glass batch containing substantial amounts of silica and alkali and containing an antimony compound, and forming over the surface of the glass during the melting operation a thin film of antimony material, which protects the glass from coloring from said container.

24. The method of making glass which consists of melting in a graphite container, a borosilicate glass batch containing an antimony compound, and forming over the surface of the glass during the melting operation a thin film of antimony material.

25. The method of making glass which consists of melting in a graphite container, a glass batch for a soda-lime glass, containing an antimony compound, and forming over the surface of the glass during melting a thin film of antimony material.

26. The method of making substantially colorless glass which consists of melting a glass batch containing an antimony compound in contact with solid carbonaceous material and causing a film of reduced antimony to form about the glass to protect such glass from the carbon.

27. The method of making glass which consists in melting a glass batch containing an antimony compound under oxidizing conditions in contact with carbonaceous material.

28. The method of making glass which comprises melting a glass batch containing an antimony compound and an oxidizing agent in contact with carbonaceous material.

MERCIE P. LOCKE,
As Executrix of the last will of Fred M. Locke.
MERCIE P. LOCKE,
As Administratrix de bonis non of the estate of Fred J. Locke.